US006624868B1

(12) United States Patent
Terukina et al.

(10) Patent No.: US 6,624,868 B1
(45) Date of Patent: Sep. 23, 2003

(54) CHIP-ON-GLASS (COG) STRUCTURE LIQUID CRYSTAL DISPLAY (LCD)

(75) Inventors: Asao Terukina, Yokohama (JP); Katsurou Hayashi, Fujisawa (JP); Yoshiharu Fujii, Warabi (JP); Mitsuru Ikezaki, Sagamihara (JP); Mikio Kurihara, Yamato (JP); Fumitoshi Kiyooka, Yamato (JP); Hideo Iiyori, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/503,245

(22) Filed: Feb. 14, 2000

(30) Foreign Application Priority Data

Feb. 16, 1999 (JP) .............................. 11-036878

(51) Int. Cl.⁷ ............................................. G02F 1/1345
(52) U.S. Cl. ....................... 349/149; 349/150; 349/151; 349/152
(58) Field of Search .............................. 349/149–152

(56) References Cited

U.S. PATENT DOCUMENTS 5,670,994 A * 9/1997 Kawaguchi et al. ........ 349/150
5,712,493 A * 1/1998 Mori et al. ................... 257/59
6,049,368 A * 4/2000 Song ............................ 349/139
6,211,849 B1 * 4/2001 Sasaki et al. ................. 345/55
6,407,795 B1 * 6/2002 Kamizono et al. .......... 349/149
6,424,400 B1 * 7/2002 Kawasaki ................... 349/149

FOREIGN PATENT DOCUMENTS

| JP | 5-107551 |   | 4/1993 |
| JP | 5107551  | * | 4/1999 |

* cited by examiner

Primary Examiner—Tarifur R. Chowdhury
(74) Attorney, Agent, or Firm—Robert M. Trepp, Esq.; McGinn & Gibb, PLLC

(57) ABSTRACT

A liquid crystal display structure, includes a glass substrate and at least one or more chips mounted on the glass substrate including flexible printed circuit connect pins. A common wiring for connecting the at least one or more chips to a flexible printed circuit is formed on the glass substrate. The common wiring is connected to the flexible printed circuit connect pins of the at least one or more chips and to the flexible printed circuit at at least one position on the common wiring.

25 Claims, 3 Drawing Sheets

CHIP-ON-GLASS (COG) STRUCTURE LIQUID CRYSTAL DISPLAY (LCD)

BACKGROUND OF THE INVENTION

1. Field of the Invention

The present invention generally relates to a chip-on-glass (COG) structure liquid crystal display (LCD) having a chip mounted on a glass substrate, and more particularly, to a COG structure liquid crystal display having a wiring structure which reduces the pixel peripheral area of a liquid crystal display panel.

2. Description of the Related Art

Conventional COG structure liquid crystal displays are well known and include a chip for driving a liquid crystal display panel which is mounted on a glass substrate constituting the liquid crystal display panel. FIG. 4 illustrates an exemplary method of connecting the chips of the conventional COG structure liquid crystal display to a flexible printed circuit (FPC).

In FIG. 4, a plurality of chips 53 are aligned on a glass substrate 51 and on an outer end of a color filter 52 constituting a liquid crystal display portion of the liquid crystal display panel. A plurality of thin film transistor (TFT) connect pins 54-1, for driving the TFT constituting the LCD panel, are located on each chip 53 on the side facing the color filter 52. A plurality of FPC connect pins 54-2 are located on each chip 53 on the side facing the end of the glass substrate 51. The TFT connect pins 54-1 are connected to the TFT of the liquid crystal display panel through wires 56 (e.g., for ease of understanding only the wires on both the ends are shown in FIG. 4). The FPC connect pins 54-2 are connected to a flexible printed circuit (FPC) 58 through a connection terminal 57.

The conventional COG structure liquid crystal display described above can provide a liquid crystal panel with reduced thickness. However, the COG structure LCD is problematic, compared to the LCD for which a Tape Automated Bonding (TAB) method is utilized, in that it has difficulty reducing the pixel peripheral area in order to increase the area of the display portion of the LCD panel. That is, in the structure shown in FIG. 4, the chip 53 is connected to the FPC 58 through the FPC connection terminal 57. Thus, a region where the FPC connection terminal 57 is provided is not practical for reducing the pixel peripheral area.

Alternatively, a wiring structure is proposed in Japanese Patent Publication No. 5-107551 as a technique for reducing the pixel peripheral area of the COG structure liquid crystal display. In this structure, the chips are covered with the FPC and the chips are connected to the FPC by a connection terminal situated between the chips.

However, while this wiring structure reduces the pixel peripheral area, it is unsuitable for reducing panel thickness because the chips are covered with the FPC. Thus, the FPC has a wavy structure along the thickness of the panel.

Further, this wiring structure has a problem regarding connection reliability, since all the chips are connected directly to the FPC, similar to the above-mentioned conventional structure, thereby requiring a large number of connectors.

Further, with this structure, it is difficult to reduce size, because the FPC connection terminal is placed between all the chips. Thus, a gap between the chips is always required.

SUMMARY OF THE INVENTION

In view of the foregoing and other problems, disadvantages, and drawbacks of the conventional display panels the present invention has been devised, and it is an object of the present invention to provide a COG structure liquid crystal display which solves the above problems and can effectively reduce the pixel peripheral area even in the COG structure.

In a first aspect, a COG structure liquid crystal display according to the present invention includes a chip mounted on a glass substrate. In this COG structure LCD, a common wiring for connecting a plurality of chips to a FPC is formed on the glass substrate. The common wiring is connected to the FPC at at least one position on the common wiring. In the present invention, the common wiring may be connected to FPC connector pins of the chip through pin pads.

Further, in the present invention, the chips are connected to the FPC by the following structure in order to connect the chips to an external device. That is, the common wiring for a plurality of chips is formed on a glass substrate, and the FPC is connected to the common wiring at one or more positions. Thus, there is no need for the FPC connect pad which has been used conventionally on the end of the glass substrate. Consequently, a pixel peripheral area can be reduced in that the FPC connect pad is eliminated. Moreover, the chip is connected to the FPC at at least one position. Thus, the number of connectors can be reduced, and therefore the reliability of the connection can be improved.

The present disclosure relates to subject matter contained in Japanese Patent Application 11-036878, filed Feb. 16, 1999, which is expressly incorporated herein by reference in its entirety.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
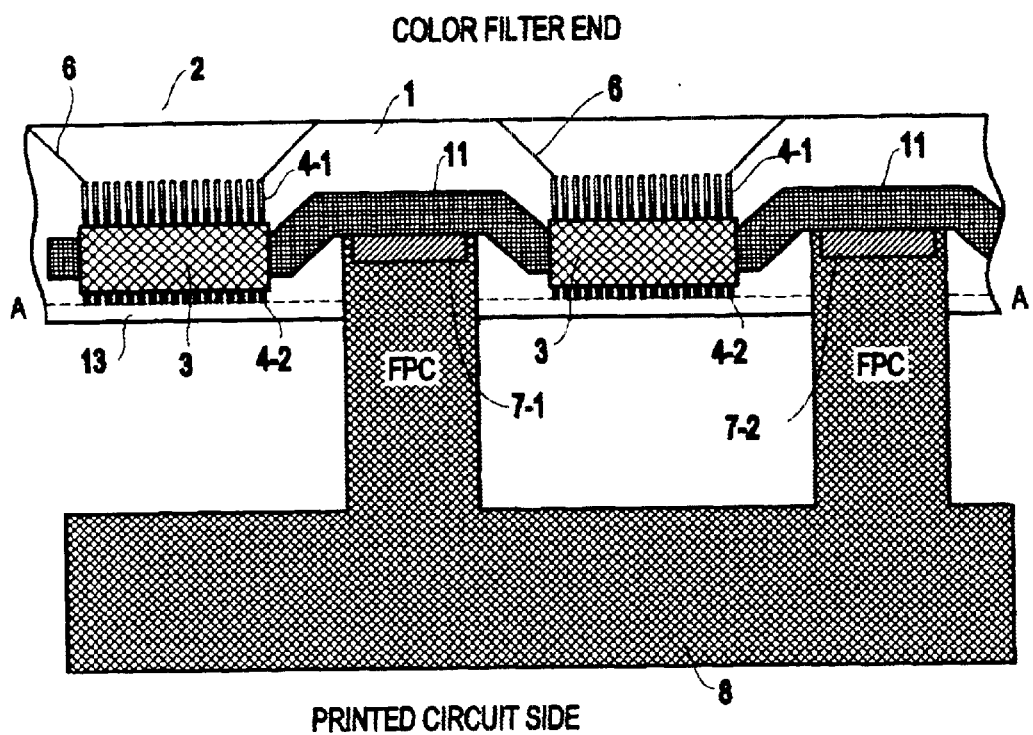
FIG. 1 illustrates an exemplary method and structure for connecting chips of a COG structure liquid crystal display of the present invention to a FPC.
Figure 2:
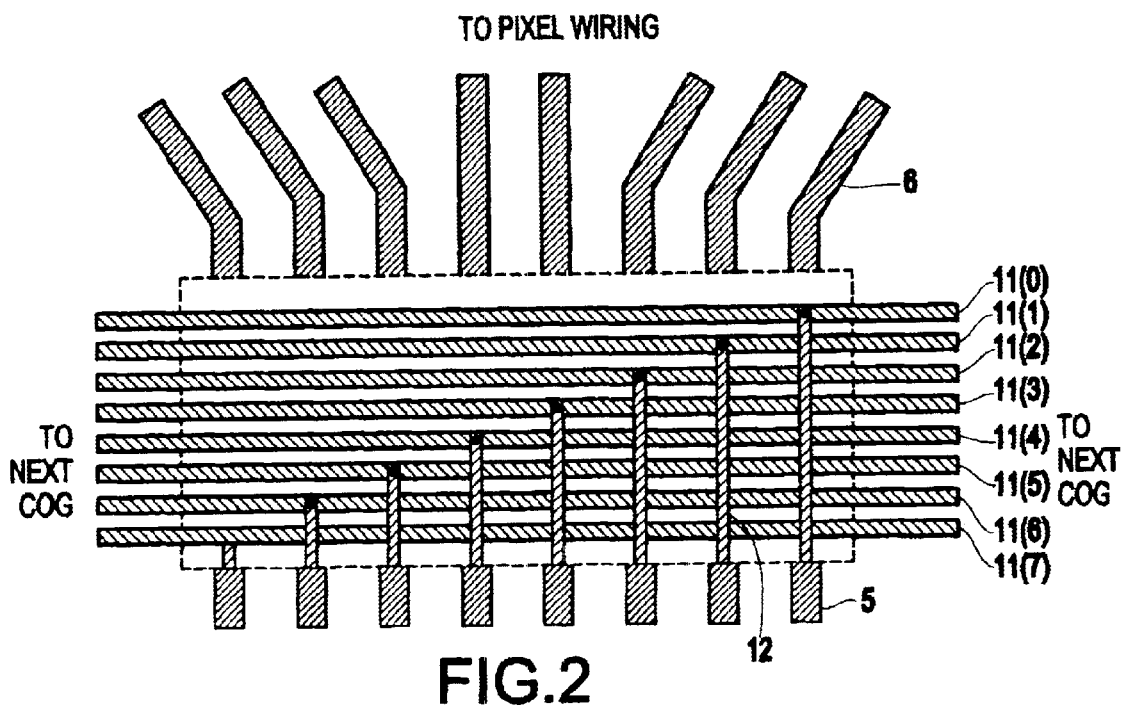
FIG. 2 illustrates an exemplary connection of common wiring to FPC connect pins of the chip in the present invention.
Figure 3:
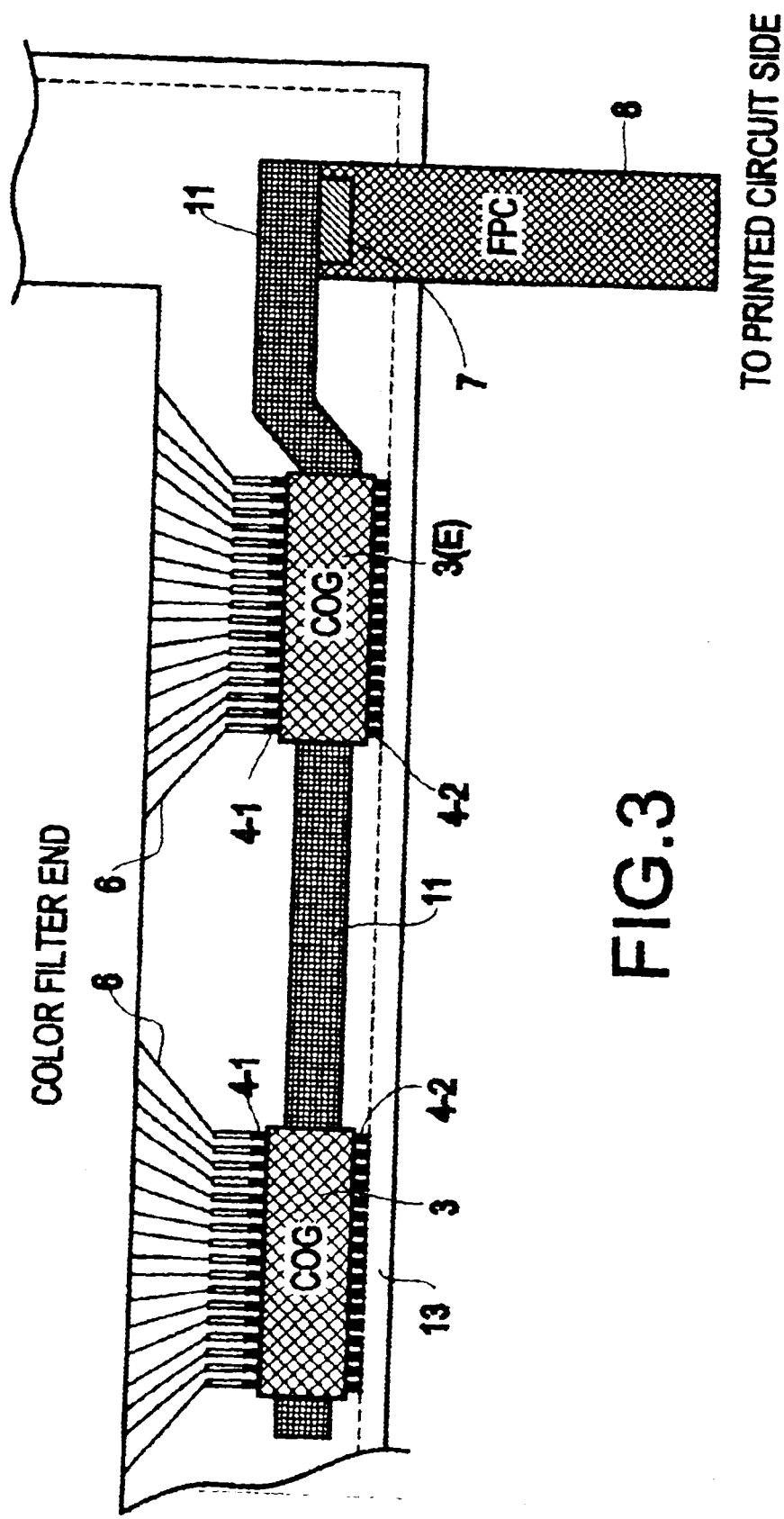
FIG. 3 illustrates another exemplary method and structure for connecting the chips of the COG structure LCD of the present invention to the FPC.
Figure 4:
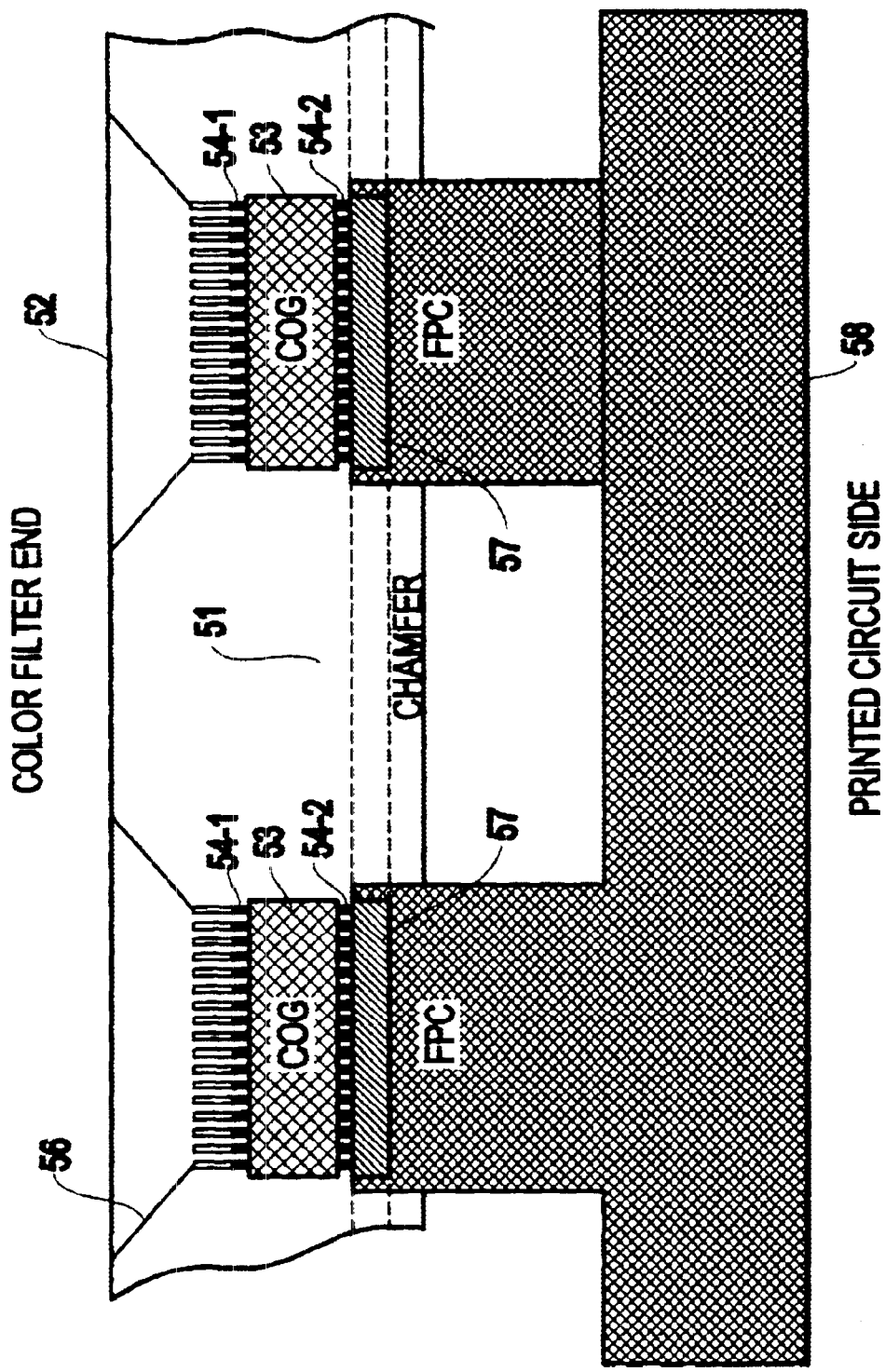
FIG. 4 illustrates a conventional method and structure of connecting chips of a conventional COG structure LCD to the FPC.

Referring now to the drawings, and more particularly to FIGS. 1–3, there are shown preferred embodiments of the method and structures according to the present invention.

In one preferred embodiment of the present invention, the common wiring is formed on a glass substrate inside a line connecting side surfaces of a plurality of chips aligned on the end of the glass substrate, on the side facing an end surface of the glass substrate. Moreover, the number of the common wiring connections is the same as the number of the FPC connect pins of the chip.

Furthermore, a plurality of chips are included on the common wiring. The common wiring is connected to the FPC at one position outside an endmost chip on the glass substrate, at a plurality of positions between the chips, or outside the chip on the glass substrate so that the common wiring does not overlap the FPC at a plurality of connections. In any of these preferred aspects, the pixel peripheral area can be more effectively reduced.

Referring to FIG. 1, a method for connecting chips of a COG structure LCD to an FPC is shown according to the present invention. In this aspect, a plurality of chips 3 are aligned on a glass substrate 1 and on an outer end of a color filter 2 constituting an LCD portion.

A plurality of TFT connect pins 4-1, used to drive the TFT constituting a LCD panel, are located on each chip 3 on the side facing (e.g., opposing) the color filter 2. A plurality of FPC connect pins 4-2 are located on each chip 3 on the side facing the end of the glass substrate 1. The TFT connect pins 4-1 are connected to the TFT of the LCD panel through wires 6 (e.g., only the wires on both the ends are shown in this drawing). The structure described so far is the same as a structure found in a conventional COG structure LCD.

The unique features of the first embodiment of the present invention, as shown in FIG. 1, will now be described. Common wiring 11 (e.g., "a collection of wires") for connecting a plurality of chips 3 to an FPC 8 is formed on the glass substrate 1. The common wiring 11 is connected to the plurality of FPC connect pins 4-2 of the chip 3. The common wiring 11 is also connected to the FPC 8 using an FPC connection terminal 7 disposed at least one position on the common wiring 11. These elements will be described in greater detail below.

First, in the exemplary structure of FIG. 1, the common wiring 11 is formed on the glass substrate 1 located under the chips 3 and curved toward the color filter 2 at a position where FPC connectors 7-1 and 7-2 are disposed between the chips 3. The common wiring 11 is located on the glass substrate 1 inside a line A—A connecting side surfaces of a plurality of chips 3 aligned on the end of the glass substrate 1, on a side facing an end surface of the glass substrate 1. The common wiring 11 is formed such that the FPC connect pins 4-2 of each chip 3 are in contact with the line A—A. Only a chamfer 13 of the glass substrate 1 is situated outside the line A—A.

Typically, the number of connectors of the common wiring 11 is the same as the number of the FPC connect pins 4-2 of the chip 3. In the exemplary embodiment, the number of FPC connect pins 4-2 is 17 and thus the number of connectors of the common wiring 11 is 17. Of course, any number of pins/connectors could be used as would be known by one of ordinary skill in the art within the purview of the present specification.

As shown in FIG. 1, the common wiring 11 is connected to the FPC connect pins 4-2 of the chip 3 (e.g., the pins 4-2 being loaded under the chip 3).

In more detail, FIG. 2 illustrates the connection of common wiring 11 to the FPC connect pins 4-2 of the chip 3 according to the present invention.

In FIG. 2, the chip 3 is mounted at a position indicated by a rectangular dotted line, and the number of connectors of the common wiring 11 and FPC connect pins 4-2 of the chip 3 is 8. The eight connectors 5 are separately connected to the eight common wiring 11 through eight wires 12. These eight connectors 5 separately contact the FPC connect pins 4-2 of the chip 3 when the chip 3 is mounted on the glass substrate.

Preferably, a material available in the process of the wiring for the LCD portion (e.g., MoW or Al) is used as the material for the common wiring 11 and the wire 12. The material (e.g., MoW or Al) and the wiring portion of the display can be simultaneously printed and formed on the glass substrate 1. An insulating layer is formed between the wire 12 and the common wiring 11 at intersections of the wire 12 and the common wiring 11, other than at a connection point, whereby the wire 12 and the common wiring 11 are electrically insulated. Thus, the common wiring 11 and wire 12 formed by printing and the connect point are improved in reliability, compared to the conventional connection (e.g., the contact of the connectors).

Furthermore, in the first preferred embodiment shown in FIG. 1, the common wiring 11 is connected to the FPC 8 by the FPC connectors 7-1 and 7-2 disposed at two positions on the common wiring 11. Each of the FPC connectors 7-1 and 7-2 is formed at one position where the common wiring 11 is curved toward the color filter 2 between the chips 3. A predetermined number of the FPC connectors 7 are disposed on the glass substrate 1. The common wiring 11 is connected to the FPC 8 by the FPC connectors 7-1 and 7-2 at two positions so that the common wiring 11 does not overlap the FPC 8. A configuration in which the common wiring 11 does not overlap the FPC 8 will be described with reference to FIG. 2.

In his configuration, assuming that the connect portions for common wiring 11(0)–11(4) of common wiring 11(0)–11(7) are formed at the position where the terminal of FPC connector 7-1 is located, the connectors for the common wiring 11(5)–11(7) may be formed at the position where the terminal of FPC 7-2 is located. Any connection is sufficient so long as the common wiring 11 can be connected to the FPC 8 as a whole. Further, a known ACF connection technique can be suitably used to connect each pad of the FPC connectors 7 to the FPC 8.

In the exemplary structures shown in FIGS. 1 and 2, the FPC connect pins 4-2 of the chip 3 can be brought into contact with the end of the glass substrate 1 and substantially the chamfer 13 of the end. Thus, a pixel peripheral area of the LCD panel can be reduced. Moreover, the common wiring 11 can be connected to the FPC 8 by only the FPC connectors 7-1 and 7-2 disposed at one position or more (e.g., two positions in the example of FIG. 1) on the common wiring 11. Thus, the number of connections using the connectors can be reduced to only the number of the common wiring 11.

As a result, the reliability of the connection can be improved. Even if the common wiring 11 is connected to the FPC 8 by using the two FPC connectors 7-1 and 7-2, the number of connectors at the FPC connection terminal 7-1 or 7-2 can be reduced, compared to a connection of the entire common wiring 11 by one FPC connection terminal 7. Thus, a distance between the chips 3 can be reduced.

FIG. 3 shows another aspect of a method and structure of connecting the chips of the COG structure LCD of the present invention to the FPC. In FIG. 3, the same members as those shown in FIG. 1 are indicated by the same reference numerals and, therefore, a description thereof will be omitted. A difference between the structures of FIG. 1 and FIG. 3 is that, in FIG. 3, the common wiring 11 is connected to the FPC 8 at one position outside an endmost chip 3(E) on the glass substrate 1 without using two FPC connectors 7.

In this aspect, only one FPC connection terminal 7 is used. Although the FPC connection terminal 7 requires as many connectors as the common wiring 11, even if the pixel peripheral area is reduced there is sufficient space outside the chip 3(E), thereby causing no problem. In this example, only the common wiring 11 is situated between the chip 3 and chip 3(E). Thus, the distance between chips can be reduced as compared to the exemplary structure of FIG. 1, and therefore, a pixel size can be further reduced.

Two aspects have been described in the above embodiment (e.g., the common wiring 11 connected to the FPC 8 by two FPC connectors 7-1 and 7-2 (e.g., FIG. 1) and the common wiring 11 connected by one FPC pad 7 (e.g., FIG. 3)). However, the present invention is not limited to these exemplary structures, but can be achieved even if the number of FPC connectors 7 is more than two. In the present invention, as the number of the FPC connectors 7 is increased, the number of the connectors at one FPC connection terminal 7 is correspondingly reduced. Thus, a width of each FPC connection terminal 7 can be reduced. Moreover, the number of pins 4-1 and 4-2 of the chip 3 and the number of connectors 5-1 and 5-2 are not, of course, limited to the above embodiment.

As evident from the above description, according to the present invention, the chips are connected to the FPC by this unique structure in order to connect the chips to an external device. That is, the common wiring for a plurality of chips is formed on a glass substrate, and an FPC is connected to the common wiring at at least one position. Thus, there is no need for the FPC connection terminal which has previously been required on the end of the glass substrate. As a consequence, the pixel peripheral area can be reduced by eliminating the FPC connection terminal. Moreover, the chip is connected to the FPC at at least one position. Thus, the number of connections can be reduced by using the connectors, thereby improving the reliability of the connection.

While the invention has been described in terms of preferred embodiments, those skilled in the art will recognize that the invention can be practiced with modification within the spirit and scope of the appended claims.

What is claimed is:

1. A liquid crystal display structure, comprising:
    a glass substrate; and
    at least one chip mounted on the glass substrate, said chip including flexible printed circuit connect pins; and
    a common wiring for connecting a plurality of chips, including said at least one chip, to a flexible printed circuit is formed on the glass substrate, said common wiring being connected to said flexible printed circuit connect pins of the chip, and said common wiring being connected to the flexible printed circuit at at least one position on said common wiring,
    wherein said chip is physically isolated from said flexible printed circuit.

2. The liquid crystal display structure, according to claim 1, wherein said common wiring is formed on the glass substrate inside a line connecting side surfaces of said plurality of chips aligned on an end of the glass substrate, said side surfaces facing said end of the glass substrate.

3. The liquid crystal display structure, according to claim 1, wherein a number of connections of said common wiring is the same as a number of said flexible printed circuit connect pins of the chip.

4. The liquid crystal display structure, according to claim 1, wherein said plurality of chips is disposed on said common wiring.

5. The liquid crystal display structure, according to claim 1, wherein said common wiring is connected to the flexible printed circuit at a single position outside an endmost chip on the glass substrate.

6. The liquid crystal display structure, according to claim 1, wherein said common wiring is connected to the flexible printed circuit at at least one position between the chips, so that said common wiring does not overlap the flexible printed circuit at a plurality of connection portions.

7. The liquid crystal display structure, according to claim 1, wherein said common wiring is connected to the flexible printed circuit outside the chip on the glass substrate so that said common wiring does not overlap the flexible printed circuit at a plurality of connection portions.

8. The liquid crystal display structure, according to claim 1, wherein an electrical connection of said chip is through said common wiring.

9. The liquid crystal display structure, according to claim 1, wherein said common wiring comprises a collection of individual wires and each of said flexible printed circuit connect pins of the chip are each connected to said common wiring through a wire.

10. The liquid crystal display structure, according to claim 9, wherein said common wiring comprises a plurality of first wires and each of said flexible printed circuit connect pins of the chip are connected to one of a plurality of second wires.

11. The liquid crystal display structure, according to claim 10, wherein a connection of said common wiring and said flexible printed circuit connect pins of the chip comprises a connection of each of said plurality of first wires to a corresponding one of said plurality of second wires.

12. The liquid crystal display structure, according to claim 11, wherein an insulating layer is formed between said second wires and said common wiring other than at a connection point of each of said second wires and said common wiring.

13. A display, comprising:
    a glass substrate;
    at least one chip mounted on the glass substrate, said chip including flexible printed circuit connect pins; and
    a common wiring for connecting a plurality of chips, including said at least one chip, to a flexible printed circuit is formed on the glass substrate, said common wiring being connected to said flexible printed circuit connect pins of the chip,
    wherein said chip is physically isolated from said flexible printed circuit.

14. The display, as claimed in claim 13, wherein said common wiring is connected to the flexible printed circuit at at least one position on said common wiring.

15. The display, according to claim 13, wherein said common wiring is formed on the glass substrate inside a line connecting side surfaces of said plurality of chips aligned on end of the glass substrate, said side surfaces facing said end of the glass substrate.

16. The display, according to claim 13, wherein a number of connections of said common wiring is the same as a number of said flexible printed circuit connect pins of the chip.

17. The display, according to claim 13, wherein said plurality of chips is disposed on said common wiring.

18. The display, according to claim 13, wherein said common wiring is connected to the flexible printed circuit at a single position outside an endmost chip on the glass substrate.

19. The display, according to claim 13, wherein said common wiring is connected to the flexible printed circuit at at least one position between the chips, so that said common wiring does not overlap the flexible printed circuit at a plurality of connection portions.

20. The display, according to claim 13, wherein said common wiring is connected to the flexible printed circuit outside the chip on the glass substrate so that said common wiring does not overlap the flexible printed circuit at a plurality of connection portions.

21. A display, comprising:

a glass substrate;

at least one chip mounted on the glass substrate, said chip including flexible printed circuit connect pins; and means, formed on the glass substrate, for commonly connecting a plurality of chips, including said at least one chip, to a flexible printed circuit, said means for connecting being connected to said flexible printed circuit connect pins of the chip, wherein said chip is physically isolated from said flexible printed circuit.

22. The display, as claimed in claim 21, wherein said means for connecting is connected to the flexible printed circuit at at least one position on said means for connecting.

23. The display, according to claim 21, wherein said means for connecting is formed on the glass substrate inside a line connecting side surfaces of a plurality of chips aligned on an end of the glass substrate, said side surfaces facing said end of the glass substrate.

24. The display, according to claim 21, wherein a number of connections of said means for connecting is the same as a number of said flexible printed circuit connect pins of the chip.

25. The display, according to claim 21, wherein said plurality of chips are disposed on said means for connecting.

* * * * *